United States Patent Office 3,773,805
Patented Nov. 20, 1973

3,773,805
11-HALO-3,7,11-TRIALKYL-2-ALKENOIC AND 2,6-ALKADIENOIC ACID AMIDES
John B. Siddall, 975 California Ave., and Jean Pierre Calame, 3401 Hillview Ave., both of Palo Alto, Calif. 94304
No Drawing. Application Apr. 21, 1969, Ser. No. 818,130, now abandoned, which is a continuation-in-part of application Ser. No. 618,339, Feb. 24, 1967, which in turn is a continuation-in-part of applications Ser. No. 579,490, Sept. 15, 1966, Ser. No. 590,195, Oct. 28, 1966, Ser. No. 592,324, Nov. 7, 1966, Ser. No. 594,664, Nov. 16, 1966, and Ser. Nos. 605,566 and 605,578, both Dec. 29, 1966, all now abandoned. Divided and this application May 3, 1971, Ser. No. 139,916
Int. Cl. A01n 9/20; C07c 103/10, 103/56
U.S. Cl. 260—404          10 Claims

ABSTRACT OF THE DISCLOSURE

Hydrocarbon amides and N-substituted hydrocarbon amides containing at least 12 carbon atoms in the hydrocarbon backbone chain and alkyl substituents at the C-3, 7 and 11 positions and/or double bond unsaturation between C-2,3, C-6,7, and C-10,11 and/or substituents at each of positions C-2,3,6,7,10 and 11 which are arthropod maturation inhibitors.

---

This is a division of application Ser. No. 818,130, filed Apr. 21, 1969, now abandoned which is a continuation-in-part of United States application Ser. No. 618,339, filed Feb. 24, 1967 which is, in turn, a continuation-in-part of United States applications Ser. No. 605,578, filed Dec. 29, 1966, now abandoned Ser. No. 605,566, filed Dec. 29, 1966, now abandoned Ser. No. 594,664, filed Nov. 16, 1966, now abandoned, Ser. No. 592,324, filed Nov. 7, 1966, now abandoned Ser. No. 590,195, filed Oct. 28, 1966, now abandoned, and Ser. No. 579,490, filed Sept. 15, 1966, now abandoned.

The present invention relates to novel organic compounds. The present invention more particularly pertains to long chain hydrocarbon amides having a chain length of up to 17 carbon atoms in the backbone, to certain unsaturated and substituted derivatives thereof, to certain intermediates therefor, and to methods for the preparation of such compounds.

The hydrocarbon amides of the present invention are represented by the following structural Formula A:

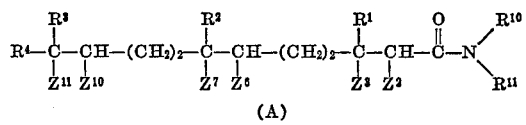

(A)

wherein each of $R^1$, $R^2$, $R^3$ and $R^4$ is lower alkyl; $Z^2$ is hydrogen, hydroxy and ethers thereof: $Z^3$ is hydrogen, hydroxy and esters and ethers thereof, bromo, chloro, fluoro, or when taken together with $Z^2$, is a carbon-carbon double bond between C-2,3 or one of the groups >O, >CH$_2$, >CCl$_2$ or >CF$_2$; provided that $Z^2$ is hydrogen when $Z^3$ is hydrogen; $Z^6$ is hydrogen, hydroxy and esters and ethers thereof, bromo, chloro or fluoro; $Z^7$ is hydrogen, hydroxy, and esters and ethers thereof, bromo, chloro, fluoro, or, when taken together with $Z^6$, is a carbon-carbon double bond between C-6,7 or one of the groups >O, >CH$_2$, >CCl$_2$ or >CF$_2$; $Z^{10}$ is hydrogen, hydroxy, and esters and ethers thereof, bromo, chloro or fluoro; $Z^{11}$ is hydrogen, hydroxy, and esters and ethers thereof, bromo, chloro, fluoro, or, when taken together with $Z^{10}$, is a carbon-carbon double bond between C-10,11 or one of the groups >O, >CH$_2$, >CCl$_2$ or >CF$_2$; and each of $R^{10}$ and $R^{11}$ is hydrogen, alkyl, hydroxyalkyl, alkoxyalkyl, phenyl, or when taken together with the nitrogen atom to which they are atttached, pyrrolidino, morpholino, piperidino, piperazino, or 4 - (lower) - alkyl-piperazino.

The term "alkyl" refers to straight or branched chain saturated aliphatic hydrocarbons having a chain length of from one to eight carbon atoms. Typical of such alkyl groups are methyl, ethyl, propyl, isopropyl, butyl, pentyl, hexyl and octyl including the various isomeric forms thereof. When qualified by the term "lower," the alkyl group has a chain length of no more than six carbon atoms. The terms "alkoxy" and "lower alkoxy" refer to straight chain alkyloxy groups of identical length such as methoxy, ethoxy, butoxy, and the like. The terms "hydroxyalkyl" and "lower hydroxyalkyl" refer to an alkyl group as defined above, substituted with one or two hydroxy groups. Typical hydroxyalkyls and lower hydroxyalkyls include hydroxymethyl, β-hydroxyethyl, 4-hydroxypentyl, and the like. The terms "alkoxyalkyl" and "lower alkoxyalkyl" refer to an alkyl group as defined above, substituted with one or two alkoxy groups. Typical groups include methoxymethyl, 2-methoxyethyl, 4-ethoxybutyl, and the like.

Included within the scope of the above Formula A are those compounds in which the amide grouping is unsubstituted ($R^{10}=R^{11}$=hydrogen), mono-substituted (one of $R^{10}$ and $R^{11}$=hydrogen), or disubstituted ($R^{10}=R^{11}$=other than hydrogen). Also included are those compounds in which each of positions C-3,7,11 contain a lower alkyl grouping ($R^1$, $R^2$, $R^3$, $R^4$), the C-11 carbon being thus disubstituted. In addition, each of hydrocarbon backbone positions C-2,3,6,7,10,11 can be variously elaborated ($Z^2$, $Z^3$, $Z^6$, $Z^7$, $Z^{10}$, $Z^{11}$) and are, independent of the other, unsubstituted (Z groups=hydrogen) or substituted (Z groups=other than hydrogen) with various groupings, including hydroxy, (lower)alkoxy, and halogen. Each of the pair of carbon atoms C-2,3, C-6,7 and C-10,11 can be linked by a single bond, a double bond or can contain a fused grouping, such as oxido, methylene, dichloromethylene and difluoromethylene. Where the backbone is elaborated by the addition of two or more halogen atoms, they are preferably the same.

The presence of at least one and optionally two or three double bonds in the foregoing compounds permits the existence of geometric isomerism in the configuration of these compounds. This isomerism occurs with regard to the double bond bridging the C-2,3 carbon atoms, the C-6,7 atoms, and the C-10,11 atoms. Obviously, isomerism at the C-10,11 carbon atoms occurs only when $R^3$ and $R^4$ are different alkyl groups.

Thus, the isomers are the cis and trans of the monoene series; the cis,cis; cis,trans; trans,cis; and trans,trans of the diene series; and the eight isomers of the triene series; each of which isomers in each series is included within the scope of this invention. Each of these isomers are separable from the reaction mixture by which they are prepared by virtue of their different physical properties via conventional techniques, such as chromatography, including thin layer and gas-liquid chromatography, as described in more detail hereinafter.

The compounds of Formula A are arthropod maturation inhibitors. They possess the ability to inhibit the maturation of members of the phylum Arthropoda, particularly insects, in the passage from one metamorphic stage to the next metamorphic stage. Thus, in the case of insects passing from the embryo stage to the larva stage, thence to the pupa stage and thence to the adult stage, contact with an effective amount of a compound of the present invention, at any of the first three stages, inhibits passage to the next developmental stage with the insect either repeating passage through its present stage or dying. Moreover, these compounds exhibit oxicidal properties with insects and are accordingly usefu lin combating them. These compounds are very potent and thus can be used at extremely low levels, for example, from $10^{-6}$ to $10^{-9}$ g. and are thus advantageously administered over large areas in quantities suitable for the estimated insect population. Generally, the substances are liquids and for the purposes herein described, they can be utilized in conjunction with liquid or solid carriers. Typical insects against which these compounds are effective include mealworm, housefly, bollweevil, cornborer, mosquito, cockroach, moth, and the like.

Although not intending to be limited by any theoretical explanation, it appears that the effectiveness of these derivatives can be traced to their ability to mimic the activity of certain so-called "juvenile hormone" substances, such as those described in U.S. Pat. Ser. No. 2,981,655 and Law et al., Proc. Nat. Acad. Sci. 55, 576 (1966). Juvenile hormone substances have been referred to as growth hormone also. Juvenile hormone was identified as methyl 10,11-oxido-7-ethyl-3,11-trimethyltrideca-2,6-dienoate using an extract of cecropia moths by Roeller et al., Angew. Chem. internat. Edit. 6, 179 (1967) and Chemical & Engineering News, 48–49 (Apr. 10, 1967). A second juvenile hormone from the same source has been identified as methyl 10,11-oxido-3,7,11-trimethyltrideca-2,6-dienoate by Meyer et al., "The Two Juvenile Hormones from the Cecropia Silk Moth," Zoology (Proc. N.A.S.) 60, 853 (1968). In addition to the natural juvenile hormones and the unidentified mixture of Law et al. above, some synthetic terpenoids have been reported exhibiting maturation inhibiting, sterility or ovicidal activity. Bowers et al., Life Sciences (Oxford) 4, 2323 (1965); BiScience, 18, No. 8, 791 (August 1968); Williams, Scientific American 217, No. 1, 13 (July 1967); Science 154, 248 (Oct. 14, 1966); Romanuk et al., Proc. Nat. Acad. Sci. 57, 349 (1967); Masner et al., Nature 219, 395 (July 27, 1968); Canadian Pat. 795,805 (1968); and U.S. Pat. 3,429,970.

The compounds of the present invention can be prepared chemically according to the following illustrated sequence of reactions:

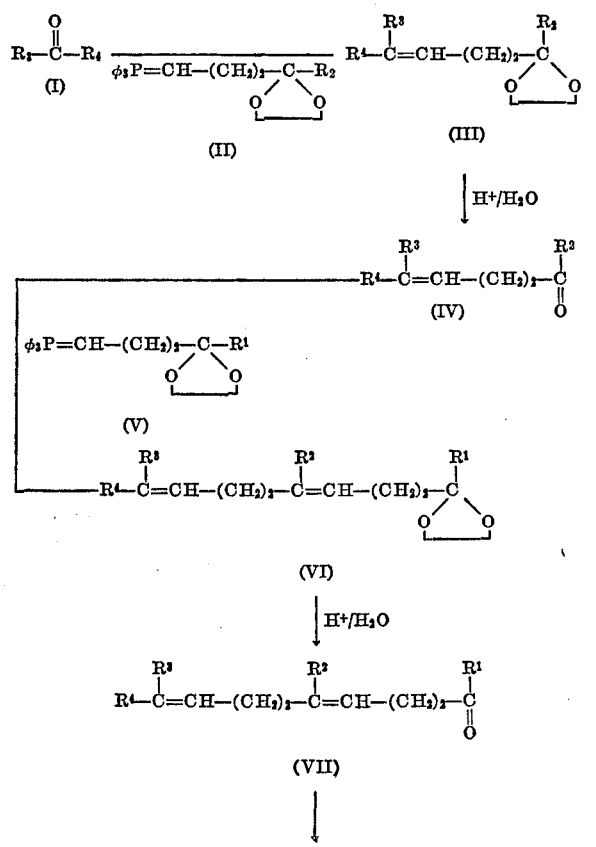

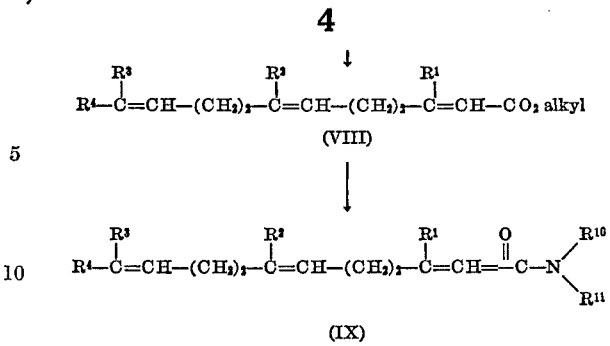

In the above scheme, each of $R^1$, $R^2$, $R^3$, $R^4$, $R^{10}$ and $R^{11}$ is as hereinbefore defined and the symbol $\phi$ represents phenyl.

With reference to the above reaction scheme (I→IX), the selected dialkylketone (I) is reacted with equal molar quantities and, preferably, an excess of the 4-ethylene ketal of the 4-alkylbutylidenetriphenylphosphorane Wittig reagent derivative (II) in orgnaic reaction medium, such as is preferably provided by dimethylsulfoxide at reflux temperature to afford the corresponding substituted ethylenedioxyalkene Wittig reaction adduct (III). This process thus makes possible the union of hydrocarbon chains with concomitant formation of double bond unsaturation at the juncture.

In the above-described process, the 4-ethylene ketal of the 4-alkylbutylidenetriphenylphosphorane Wittig reagent is prepared by conventional procedures, such as is disclosed by Trippett, Advances in Organic Chemistry, vol. I., pp. 83–102; Trippett, Quarterly Review, vol. 16–17, pp. 406–410; and Greenwald et al., Journal of Organic Chemistry 28, 1128 (1963) from the 4-ethylene ketal of a 4-alkylbutyl halide (1-halo-4-alkanone) upon treatment thereof with triphenylphosphine and subjecting the resultant phosphonium halide to the action of butyl or phenyl lithium.

The 4-ethylene ketal of the 1-halo-4-alkanone is obtained by subjecting the 4-keto compound to conventional ketalysis with ethylene glycol in benzene in the presence of an aryl sulfonic acid. The latter 1-halo-4-alkanone, particularly the 1-bromo derivative, can be prepared by processes known per se, such as that described in German Pat. No. 801,276 (Dec. 28, 1950), vide Chemical Abstracts 45, 2972h and by Jager et al., Arch Pharm. 293, 896 (1960), vide Chemical Abstracts 55, 3470g. Briefly, these procedures involve treating butyrolactone with the desired alkyl alkanoate to provide the corresponding α-acylbutyrolactone adduct therebetween. Treatment of the latter adduct with alkali metal halide, particularly sodium bromide, in aqueous sulfuric acid then provides the corresponding 1-bromo-4-alkanone. Thus, butyrolactone, when treated with ethyl acetate, gives α-acetylbutyrolactone which is, in turn, converted to 1-bromo-4-pentanone.

Hydrolysis of the Wittig reaction adduct (III) with aqueous acid affords the free ketone (IV).

By repeating the Wittig reaction just described on the thus-formed ketone (IV) with the Wittig reagent (V) (prepared as already described), the corresponding ethylene ketal diene adduct (IV) is obtained, which is, in turn, hydrolyzed with aqueous acid to the tetraalkyl substituted nonadienone (VII).

Conversion of the thus-prepared compound (VII) to the tetraalkyl substituted undecatrienoate (VIII) follows upon treatment with a diethyl carbalkoxymethylphosphonate, such as diethyl carbomethoxymethylphosphonate, in the presence of alkali metal hydride.

The novel acid amides repersented by Formula IX and otherwise corresponding to the novel amides of the present invention represented by Formula A above are thereafter conveniently prepared by treating the trienoate ester (VIII) with a selected amine salt [prepared by treating the selected amine, such as ammonia or a mono- or disubstituted ($R^{10}$ and $R^{11}$) amine with butyl lithium in organic solvent, such as hexane, in the manner described by Cope et al., Journal of the American Chemical Society 80, 2850 (1958)] preferably in ether at room temperature giving the amide directly.

Alternatively, the amides hereof can be prepared by first converting the acid ester (VIII) to the corresponding acid or acid halide thereof, the acid halide, notably the chloride, being preferred. This process involves first hydrolyzing the ester with sodium carbonate in the presence of aqueous methanol. The acid chloride is then prepared by treating the free acid with phosphorus trichloride, phosphorus pentachloride, sulfonyl chloride, oxalyl chloride, and the like, at room temperature or gentle reflux with benzene being used as the solvent. The acid halide is thereafter treated with an excess of the selected amine in non-aqueous, inert organic solvent, generally at or about room temperature.

After the backbone hydrocarbon amide has thus been prepared, further optional elaboration of the molecule (represented in formula A by groups $Z^2$, $Z^3$, $Z^6$, $Z^7$, $Z^{10}$ and $Z^{11}$) via certain preferred sequences, is conducted as follows.

The addition of the fused methylene (cyclopropyl) group to the unsaturated positions of the molecule can be performed selectively at C–2, 3 by the reaction of the unsaturated compound with dimethylsulfoxonium methylide base [prepared in the manner of Corey et al., Journal of the American Chemical Society 87, 1353 (1965)] in dimethylsulfoxide. Addition of the fused methylene group at the C–6,7 and C–10,11 positions follows upon reaction of the unsaturated linkages with methylene iodide and a zinc-copper couple in the manner of Simmons and Smith, Journal of the American Chemical Society 81, 4256 (1959).

Similarly, the formation of the epoxide is selectively performed at the C–2,3 position by reaction with hydrogen peroxide in aqueous alkali medium, such as is usually provided by sodium hydroxide. Addition of the oxido group at the C–6,7 and C–10,11 positions is performed with m-chloroperbenzoic acid, preferably in methylene chloride or chloroform solutions.

The fused difluoromethylene group at positions C–6,7 and C–10,11 is added by reacting the starting monoene or diene with trimethyltrifluoromethyl tin in the presence of sodium iodide in benzene/monoglyme solvent at reflux over a period of a few hours. By varying the mole ratio of the two reactants and the temperature and time of reaction, the reaction can be favored toward one or the other mono adducts and the bis adduct.

The fused dichloromethylene group is introduced by reacting the monoene or diene (at C–6,7 and/or C–10,11) with phenyldichlorobromomethyl mercury in benzene at reflux for from one to five hours. Again, the relative yield of one or the other mono adducts and the bis adduct varies with the amount of mercury reagent and the reaction conditions employed. Generally, about or slightly more than one molar equivalent provides the mono adducts, the bis adduct being favored by use of two or more equivalents.

Hydrogenation of one or more of the double bonds to the corresponding saturated (carbon-carbon single bond) linkage ($Z^2 = Z^3 =$ hydrogen, $Z^6 = Z^7 =$ hydrogen, $Z^{10} = Z^{11} =$ hydrogen) is conveniently performed in benzene over a 5% palladium catalyst on carbon support, halogen atoms being later introduced as described later.

The hydroxy, ether, such as lower alkoxy, and halo groups at one or more positions on the backbone chain as indicated by the above definitions relating to Formula A are introduced via a number of methods.

At the C–2,3 position, the monohydroxy substituent at C–2,3 ($Z^2 =$ hydrogen, $Z^3 =$ hydroxy) is introduced by first selectively forming the 2,3-oxido derivative as described above and thereafter opening the ring by treatment with a mole or less of lithium aluminum hydride under mild conditions, such as at temperatures of from 0° C. to about 30° C. for a short time.

Etherification is thereafter conducted by methods known per se. For example, the hydroxy group can be treated with sodium hydride followed by a hydrocarbon halide, e.g. an alkyl halide, such as ethyl bromide, to form the desired ether group, such as lower alkoxy. 2-Halotetrahydropyran and 2-halotetrahydrofuran are utilized for the corresponding tetrahydropyran-2-yl and tetrahydrofuran-2-yl ethers. Acylation is likewise accomplished by known chemical processes, such as through the use of an acid anhydride in the presence of acid catalyst, for example, p-toluenesulfonic acid.

The bis 2,3-dihydroxy compounds are prepared by treating the 2,3-oxido derivative with 0.1 to 0.001 N perchloric acid in aqueous solution at room temperature for about 16 hours. The 2-hydroxy-3-lower alkoxy compounds are formed by similar catalytic treatment of the epoxide with perchloric acid in the presence of an alkanol. The 2-hydroxy-3-halo compounds are prepared by treating the 2,3-epoxide with hydrogen halide, the 3- halo being the halogen of the acid used.

Each of the C–6,7 and C–10,11 positions are similarly elaborated. The monosubstituted derivatives ($Z^6 = Z^{10} =$ hydrogen) are prepared by treating the mono- or diene with aqueous sulfuric acid to afford the monohydroxy compounds ($Z^7$ and/or $Z^{11} =$ hydroxy). Etherification and esterification thereof is performed as described above. The monohalo compounds ($Z^7$ and/or $Z^{11} =$ halo) are prepared by similarly treating the unsaturated linkage with hydrogen halide, the halo substituent being the one of the acid employed. In the 6,10-diene or 2,6,10-triene series, if a halogenated hydrocarbon solvent, such as carbon tetrachloride, is used in this reaction, the mono 11-halo adduct is favored. By using an alternative solvent, such as an ether, e.g. diethyl ether, or hydrocarbon, e.g. benzene, this favoritism is upset and the 7-mono-, 11-mono- and 7,11-dihalo products are obtained.

The bishydroxy derivatives ($Z^6 = Z^7 =$ hydroxy and/or $Z^{10} = Z^{11} =$ hydroxy) are prepared from the precursor epoxide (introduced as described above) with aqueous acid as set forth above. Similarly, the procedure given above in the insertion of the 6(10)-hydroxy-7(11)-alkoxy and 6(10)-hydroxy-7(11)-halo substituents analagously apply.

In the preparation of the 6(10)-bromo- and 6(10)-chloro-7(11)-hydroxy compounds, the starting unsaturated compound is treated with the appropriate quantity of N-bromo- or N-chlorosuccinimide in aqueous organic solvent, such as dioxane. The corresponding 7(11)-alkoxy compounds are similarly prepared in the presence of dry alkanol solvent. Use of hydrogen fluoride starting with the corresponding oxido compounds affords some of the 6(10)-fluoro-7(11)-hydroxy derivatives. Treatment thereof with acidified alkanol solution affords the corresponding lower alkoxy compounds.

The dihalo compounds ($Z^6 = Z^7 =$ halo and/or $Z^{10} = Z^{11} =$ halo) are formed by treating the olefin with bromine, chlorine or fluorine in a chlorinated hydrocarbon solvent, such as chloroform and methylene chloride.

In the practice of the above described elaborations on the compounds hereof, relative sensitivities of various groups to certain reaction conditions dictates the preference for a general pattern of reaction sequence. Thus, in accordance herewith, the methyleneation reaction is usually performed initially on the triene. As mentioned, this can be done selectively.

The remaining sites of unsaturation are generally epoxidized as the next step. This is particularly true for epoxidations at the C–2,3 position for which it is preferred not to have present a halo substituent on the backbone chain. However, since the acidic conditions required for the addition of hydrogen halides cleave the epoxide, it is preferred to insert the oxide after such reactions are performed unless, of course, the epoxide is required for the insertion of the hydroxy (alkoxy)halo bis-substituents, and the like.

With the exception of the above proviso for the oxido group, the fused halomethylene groups are preferably introduced after the fused methylene and oxido groups are present since these reactions are compatible with these groups.

After all desired elaboration is complete, hydrogenation of any of the unsubstituted double bonds is, if desired, carried out. Halogenation in the instance of introducing a tertiary halo atom is preferably conducted on the desired olefin isolated after hydrogenation.

Certain exceptions to the above general and preferred sequence exist; however, upon slight modification of the reactions according to the purposes desired in the preparation of particular compounds embraced by the present invention, chemical obstacles are overcome. These modifications are, as a whole, obvious to one skilled in the art and/or apparent by the preparative procedures set forth in the examples contained hereinafter.

Separation of the various geometric isomers can be performed at any appropriate or convenient point in the overall process. An advantageous and particular synthetically valuable point at which isomers can be separated by chromatography, and the like, is at the conclusion of each step of the backbone synthesis, that is, after preparing each of the compounds represented by Formulas III, VI, and VIII.

The following examples will serve to further typify the nature of this invention. As these are presented solely for the purpose of illustration, they should not be construed as a limitation on the scope of this invention. In some instances, for convenience, the various isomeric forms are specified; however, in any of the reaction steps, the carbon-carbon double bonds can be cis or trans independent of the other and, in fact, isomeric mixtures can be employed.

EXAMPLE 1

A suspension of sodium hydride (2.3 g., 0.1 mole) and benzene (50 ml.) is added to a solution of trans,trans 3,7,11-trimethyldodeca-2,6,10-trienoic acid (23.6 g., 0.1 mole) and benzene (100 ml.). The mixture is stirred for four hours. The mixture is cooled to 0° C. and oxalyl chloride (19.0 g., 0.15 mole) is added slowly over a period of one hour. The mixture is allowed to stand for three hours. To this mixture, which contains 3,7,11-trimethyldodeca-2,6,10-trienyl chloride, diethylamine (21.9 g., 0.3 mole) is added and the resulting mixture is allowed to stand for two hours at room temperature. The mixture is evaporated to dryness under reduced pressure. The residue is taken up in benzene, washed with an aqueous 5% sodium bicarbonate solution and water to neutrality, dried over sodium sulfate and evaporated to dryness to yield trans,trans N,N-diethyl 3,7,11 - trimethyl-dodeca-2,6,10-trienamide.

By substituting the corresponding cis,trans; trans,cis; and cis,cis isomeric starting materials in the above process, there is obtained: cis,trans N,N-diethyl 3,7,11 - trimethyldodeca-2,6,10-trienamide; trans,cis N,N-diethyl 3,7,11-trimethyldodeca-2,6,10-trienamide; and cis,cis N,N-diethyl 3,7,11-trimethyldodeca-2,6,10-trienamide.

EXAMPLE 2

Trans,trans 3,7,11-trimethyldodeca-2,6,10-trienoyl chloride (2.54 g., 10 mmoles), which is prepared according to the procedure described in Example 1, is added to 100 ml. of benzene, cooled to 0° C. and saturated with ammonia. The mixture is allowed to stand for one hour, then is washed with several portions of water, dried over sodium sulfate and evaporated to dryness under reduced pressure to yield trans-trans 3,7,11-trimethyldodeca-2,6,10-trienamide.

EXAMPLE 3

Trans,trans 3,7,11-trimethyldodeca-2,6-dienoyl chloride (2.56 g., 10 mmoles), prepared according to the procedure described in Example 1, is added to a solution of 1-ethylpiperazine (2.28 g., 20 mmoles) and tetrahydrofuran (20 ml.). The mixture is allowed to stand for four hours at 0° C.; then 50 ml. of benzene is added and the resulting mixture is washed with several portions of water, dried over sodium sulfate and evaporated to dryness to yield trans,trans N-(4'-ethylpiperazino) 3,7,11-trimethyldodeca-2,6-dienamide. The product is further purified by chromatography on alumina using benzene as a solvent.

Similarily, trans,trans N-piperidino 3,7,11-trimethyl-dodeca-2,6-dienamide can be prepared from trans,trans 3,7,11-trimethyldodeca-2,6-dienoyl chloride and piperazine.

EXAMPLE 4

Twenty-eight grams of trans,trans N,N-diethyl 3,7,11-trimethyl-11-hydroxydodeca-2,6-dienamide are added to a suspension of 3.0 g. of sodium hydride in 110 ml. of benzene. This mixture, stirred until evolution of hydrogen ceases, and 47 g. of ethyl iodide are then added with stirring. This mixture is refluxed for two hours and then washed with water. Evaporation of solvent in vacuo yields trans,trans N,N-diethyl 3,7,11-trimethyl-11-ethoxy-dodeca-2,6-dienamide.

Through the use of other alkyl iodides or alkyl bromides, the corresponding ethers are obtained, e.g. trans, trans 3,7,11 - trimethyl-11-methoxydodeca-2,6-dienamide and cis,trans N,N-diethyl 3,7,11-trimethyl-11-propoxy-dodeca-2,6-dienamide.

Use of benzyl bromide or phenethyl bromide in the foregoing procedure yields trans,trans N,N-diethyl 3,7,11-trimethyl-11-benzyloxydodeca-2,6-dienamide and trans, trans N,N-diethyl 3,7,11-trimethyl-11-phenethoxydodeca-2,6-dienamide.

Similarly, trans,trans N,N-diphenyl 3,7,11-trimethyl-11-ethoxydodeca-2,6-dienamide can be prepared from trans, trans N,N-diphenyl 3,7,11-trimethyl-11-hydroxydodeca-2,6-dieanamide and ethyl iodide.

EXAMPLE 5

Dry hydrogen chloride is bubbled through 100 ml. of ethyl ether at 0° C. for about 15 minutes. One gram of trans,trans N,N-diethyl 3,7,11-trimethyldodeca-2,6,10-trienamide is added and the resulting solution is allowed to stand at 0° C. for five hours. The solution is then washed with water, aqueous sodium bicarbonate solution, and again with water, dried over sodium sulfate and evaporated to yield an oil. Upon purification by thin layer chromatography, there is obtained trans,trans N,N-diethyl 3,7,11-trimethyl-11-chlorododeca-2,6-dienamide.

By substituting hydrogen bromide for hydrogen chloride in the foregoing procedure, there is obtained trans, trans N,N-diethyl 3,7,11-trimethyl-11-bromododeca-2,6-dienamide.

By substituting the corresponding cis,trans; trans,cis; and cis,cis isomeric starting materials in each of these variations, there are obtained: cis,trans N,N-diethyl 3,7,11-tri-methyl-11-chlorododeca-2,6-dienamide; cis,trans N,N-diethyl 3,7,11-trimethyl - 11 - bromododeca-2,6-dienamide; trans,cis N,N-diethyl 3,7,11-trimethyl-11-chlorododeca-2,6-dienamide; trans,cis N,N-diethyl 3,7,11-trimethyl-11-bromododeca-2,6-dienamide; cis,cis N,N-diethyl 3,7,11-trimethyl-11-chlorododeca-2,6-dienamide; and cis,cis N,N-diethyl 3,7,11-trimethyl-11-bromododeca-2,6-dienamide.

EXAMPLE 6

One gram of trans,trans N,N-diethyl 3,7,11-trimethyl-dodeca-2,6,10-trienamide is added to a solution of anhydrous hydrogen fluoride in tetrahydrofuran. The mixture is allowed to stand at 0° C. for 15 hours and is then washed with water, aqueous sodium bicarbonate, and again with water, dried, and evaporated to yield an oil.

This is purified by thin layer chromatography to produce trans,trans N,N-diethyl 3,7,11-trimethyl-11-fluorododeca-2,6-dienamide.

EXAMPLE 7

To a solution of 28 g. of trans,trans N,N-diethyl 3,7,11-trimethyl-11-chlorododeca-2,6-dienamide in 250 ml. of dry ethyl acetate are added 500 mg. of (4%) activated palladium-on-barium sulfate. The resulting mixture is hydrogenated at room temperature until 10% molar excess of gaseous hydrogen has been consumed. The mixture is then filtered through diatomaceous earth, diluted with four 150 ml. portions of water, dried over sodium sulfate, and evaporated to dryness under reduced pressure to predominantely yield trans N,N-diethyl 3,7,11-trimethyl-11-chlorododec-2-enamide which is purified by preparative scale gas-liquid chromatography.

Similarly, trans N,N-diethyl 3,7,11-trimethyl-11-fluorododec-2-enamide is prepared from trans,trans N,N-diethyl 3,7,11-trimethyl-11-fluorododeca-2,6-dienamide or from trans,cis N,N-diethyl 3,7,11-trimethyl-11-fluorododeca-2,6-dienamide via the procedure of this example.

By the procedure described herein, the compounds listed under II are prepared from the respective compounds listed under I.

| I | II |
| --- | --- |
| cis, trans N,N-dimethyl 3,7,11-trimethyl-11-bromododeca-2,6-dienamide. | cis N,N-dimethyl 3,7,11-trimethyl-11-bromododec-2-enamide. |
| cis, cis 3,7,11-trimethyl-11-chlorododeca-2,6-dienamide. | cis 3,7,11-trimethyl-11-chlorododeca-2-enamide. |
| trans, cis N-pyrrolidino 3,7,11-trimethyl-11-fluorododeca-2,6-dienamide. | trans N-pyrrolidino 3,7,11-trimethyl-11-fluorododec-2-enamide. |
| trans, trans N-$\beta$-hydroxethyl 3,7,11-trimethyl-11-chlorododeca-2,6-dienamide. | trans Methyl N-$\beta$-hydroxethyl 3,7,11-trimethyl-11-chlorododec-2-enamide. |
| trans, cis N,N-di-$\beta$-ethoxethyl 3,7,11-trimethyl-11-fluorododeca-2,6-dienamide. | trans N,N-di-$\beta$-ethoxethyl 3,7,11-trimethyl-11-fluorododec-2-enamide. |
| trans, cis N-(4-ethylpiperazino) 3,7,11-trimethyl-11-bromododeca-2,6-dienamide. | trans N-4(-ethylpiperazino) 3,7,11-trimethyl-11-bromododec-2-enamide. |
| cis, cis N, N-methyl, isopropyl 3,7,11-trimethyl-11-chlorododeca-2,6-dienamide. | cis N,N-methyl, isopropyl 3,7,11-trimethyl-11-chlorododec-2-enamide. |
| cis, trans N,N-ethyl. phenyl 3,7,11-trimethyl-11-fluorododeca-2,6-dienamide. | cis N,N-ethyl, phenyl 3,7,11-trimethyl-11-fluorododec-2-enamide. |

EXAMPLE 8

To a solution of 24 g. of cis,trans 3,7,11-trimethyl-11-chlorododeca-2,6-dienoic acid (prepared as described in Example 1 of copending application Ser. No. 592,324, filed Nov. 7, 1966), now abandoned, in 100 ml. of benzene is added 2.44 g. of sodium hydride; the mixture is stirred at 25° C. until the evolution of hydrogen ceases and then cooled to 7° C. Oxalyl chloride (14.5 g.) in 25 ml. of benzene is next slowly added with stirring; the mixture is then allowed to stand at 25° C. for six hours. At the end of this time, 20 ml. of diethylamine is added and the resulting mixture is stirred at 25° C. for an additional 14 hours. This mixture is washed three times with 200 ml. portions of water, dried, and evaporated in vacuo to yield cis,trans N,N-diethyl 3,7,11-trimethyl-11-chlorododeca-2,6-dienamide.

The use of ammonia or other amines in the foregoing procedure, such as methyl, dimethyl, ethyl, diisopropyl, methyl ethyl, dibutyl, di-$\beta$-hydroxethyl, ethyl phenyl, ethoxethyl amine, and the like, in place of diethyl amine yields the corresponding amides.

EXAMPLE 9

One gram of trans, trans 3,7,11-trimethyl-11-hydroxydodeca-2,6-dienoic acid (prepared as described in copending application Ser. No. 579,490, filed Sept. 15, 1966), now abandoned, in 10 ml. of diglyme is added in a dropwise fashion over a 20 minute period to a slurry of 1 g. of sodium hydride in 10 ml. of diglyme. There is next added in a dropwise fashion over a 10 minute period, 0.9 g. of 2-chlorotetrahydropyran. This mixture is stirred at about 25° C. for 30 minutes and then quenched in ice water. The organic phase is separated and extracted with ether. These extracts are washed with water, dried over sodium sulfate, and evaporated to yield trans, trans 3,7,11-trimethyl-11-(tetrahydropyran-2'-yloxy)dodeca-2,6-dienoic acid.

By employing 2-chlorotetrahydrofuran in the foregoing procedure, the corresponding tetrahydrofuranyl ether is obtained.

EXAMPLE 10

To a solution of trans, trans 3,7,11-trimethyl-11-(tetrahydrofuran - 2' - yloxy)dodeca-2,6-dienoic acid (25 g.) and dry benzene, sodium hydride (2.5 g.) is added. This mixture is stirred at room temperature until the evolution of hydrogen ceases and then cooled to about 7° C. Oxalyl chloride (15.0 g.) in dry benzene (50 ml.) is slowly added to the cooled mixture with stirring. After the addition, the resulting mixture is allowed to attain room temperature and allowed to stand for four hours. Ethylamine (20 ml.) is added and the mixture is allowed to stand for ten hours. The mixture is washed with water to neutrality, dried over sodium sulfate, and evaporated to dryness under vacuum to yield trans, trans N-ethyl 3,7,11-trimethyl-11-(tetrahydrofuran-2'-yloxy)dodeca - 2,6 - dienamide.

The product is added to a mixture of benzene (100 ml.), tetrahydrofuran (100 ml.), and aqueous 1 N hydrochloric acid (10 ml.). The resulting mixture is stirred for a 14 hour period at room temperature; then the mixture is washed with water to neutrality, dried over sodium sulfate, and reduced to dryness under vacuum at 50° C. to yield trans, trans N-ethyl 3,7,11-trimethyl-11-hydroxydodeca-2,6-dienamide.

EXAMPLE 11

To a solution of 29.1 g. of trans, trans N,N-diethyl 3,7,11-trimethyl - 11 - hydroxydodeca - 2,6 - dienamide and 250 ml. of dry ethyl acetate, 500 mg. of (4%) activated palladium-on-barium sulfate are added. The resulting mixture is hydrogenated at room temperature until 1.1 mole of gaseous hydrogen have been taken up. The mixture is filtered over a bed of diatomaceous earth. The filtrate is evaporated to dryness under reduced pressure to predominately yield the desired trans N,N-diethyl 3,7,11-trimethyl-11-hydroxydodec-2-enamide which is purified by preparative scale gas-liquid chromatography.

EXAMPLE 12

One gram of trans, trans N,N-diethyl 3,7,11-trimethyl-11-hydroxydodeca-2,6-dienamide in 8 ml. of benzene and 2 ml. of triethylamine is treated with 1 ml. of acetyl chloride. This mixture is allowed to stand for 15 hours at about 25° C. and is then poured into ice water and extracted with methylene chloride. These extracts are washed well with water, dried over sodium sulfate, and evaporated to yield trans, trans N,N-diethyl 3,7,11-trimethyl-11-acetoxy-dodeca-2,6-dienamide.

EXAMPLE 13

A solution of 20.9 g. of the ethylene ketal of methyl 3-bromopropyl ketone (obtained by treating the ketone with ethylene glycol in benzene in the presence of p-toluenesulfonic acid) in 100 ml. of benzene is treated with 20 g. of triphenylphosphine. This mixture is heated at reflux temperatures for two hours and then filtered. The solid material thus collected is washed with benzene, dried in vacuo, and added to 6.49 g. of butyl lithium in 50 ml. of dimethylsulfoxide. This mixture is stirred until a red solution is obtained and 7.2 g. of 6-hydroxy-6-methylheptan-2-one are then added. This mixture is stirred at about 25° C. for eight hours, poured into water, and extracted with ether. The ethereal extracts are concentrated and the residue thus obtained is added to a 0.1 N solution of hydrochloric acid in aqueous acetone and stirred for 15 hours. The mixture is then poured into ice water and extracted with ethyl acetate. After washing these extracts with water and drying them over sodium sulfate, they are evaporated to yield a mixture of cis and trans 10-hydroxy-10-methyl-undec-5-en-2-one which may be separated by fractional vacuum distillation or by preparative gas-liquid chromatography.

A mixture of 11.2 g. of diethyl carbethoxymethylphosphonate in 100 ml. of diglyme is treated with 2.4 g. of sodium hydride. This mixture is stirred until the evolution of gas ceases and 7.5 g. of trans 10-hydroxy-10-methyl-undec-5-en-2-one are then slowly added with stirring, maintaining a temperature below 30° C. The mixture is stirred for 15 minutes and then diluted with water and extracted with ether. These ethereal extracts are washed well with water, dried over sodium sulfate, and evaporated to remove the solvent. The residue is subjected to fractional vacuum distillation to yield cis, trans ethyl 3,7,11-trimethyl-11-hydroxydodeca-2,6-dienoate and trans, trans ethyl 3,7,11-trimethyl-11-hydroxydodeca-2,6-dienoate.

By employing the cis isomer of 10-hydroxy-10-methyl-undec-5-en-2-one in the foregoing procedure, there is obtained cis, cis ethyl 3,7,11-trimethyl-11-hydroxydodeca-2,6-dienoate and trans, cis ethyl 3,7,11-trimethyl-11-hydroxydodeca-2,6-dienoate.

EXAMPLE 14

Part A

To a solution of 20.9 g. of the ethylene ketal of 1-bromo-4-pentanone (obtained by treating 1-bromo-4-pentanone with ethylene glycol in benzene in the presence of p-toluenesulfonic acid) in 100 ml. of benzene is added 20 g. of triphenylphosphine. This mixture is heated at reflux temperature for two hours and then filtered. The solid material thus collected is washed with benzene, dried in vacuo, and added to 6.49 g. of butyl lithium in 50 ml. of dimethylsulfoxide. This mixture is stirred until an orange solution is obtained and 3.8 g. of methyl ethyl ketone is then added. This mixture is stirred at about 25° C. for about eight hours, poured into water, and extracted with ether. The ethereal extracts are concentrated and the residue thus obtained is added to a 0.1 N solution of hydrochloric acid in aqueous acetone and stirred for about 15 hours. The mixture is then poured into ice water and extracted with ethyl acetate. After washing these extracts with water and drying them over sodium sulfate, they are evaporated to yield a mixture of the cis and trans isomer of 6-methyl-5-octen-2-one which is separated by preparative gas-liquid chromatography into the individual isomers.

Part B

To a solution of 20.9 g. of the ethylene ketal of 1-bromo-4-pentanone in 100 ml. of benzene is added 20 g. of triphenylphosphine. This mixture is heated at reflux temperature for two hours and then filtered. The solid material thus collected is washed with benzene, dried in vacuo, and added to 6.49 g. of butyl lithium in 50 ml. of dimethylsulfoxide. This mixture is stirred until an orange solution is obtained and 5.5 g. of trans 6-methyl-5-octen-2-one (the ketone obtained in Part A) is then added. This mixture is stirred at about 25° C. for about eight hours, poured into water, and extracted with ether. The ethereal extracts are concentrated and the residue thus obtained is added to a 0.1 N solution of hydrochloric acid in aqueous acetone and stirred for about 15 hours. The mixture is then poured into ice water and extracted with ethyl acetate. After washing these extracts with water and drying them over sodium sulfate, they are evaporated to furnish a mixture of the trans, trans and cis, trans isomers of 6,10-dimethyldodeca-5,9-dien-2-one which is separated by preparative gas-liquid chromatography to the individual isomers.

By repeating the above precedure with the exception of using cis 6-methyl-5-octen-2-one in place of trans 6-methyl-5-octen-2-one, there is obtained a mixture of the cis, cis and trans, cis isomers of 6,10-dimethyldodeca-5,9-dien-2-one which is separated as described above.

Similarly, in the above procedure, instead of using either the trans or cis isomer of 6-methyl-5-octen-2-one as the starting material, there can be used a mixture of the isomers obtained in Part A in which case a mixture of the four isomers is obtained which can then be separated by preparative gas-liquid chromatography into the four isomers.

Part C

A mixture of 11.2 g. of diethyl carbomethoxy methylphosphonate in 100 ml. of diglyme is treated with 2.4 g. of sodium hydride. This mixture is stirred until the evolution of gas ceases and 7.5 g. of trans, trans 6,10-dimethyldodeca-5,9-dien-2-one is then slowly added with stirring, maintaining a temperature below 30° C. The mixture is stirred for about 15 minutes and then diluted with water and extracted with ether. These ethereal extracts are washed well with water, dried over sodium sulfate, and evaporated to remove the solvent to furnish a mixture of the trans, trans, trans and cis, trans, trans isomers of methyl 3,7,11 - trimethyltrideca - 2,6,10 - trienoate which is separated by preparative gas-liquid chromatography.

The above procedure is repeated with the exception of using cis, trans 6,10-dimethyldodeca-5,9-dien-2-one as the starting material in place of the trans, trans isomer and there is obtained a mixture of the cis, cis, trans and trans, cis, trans isomers of methyl 3,7,11-trimethyltrideca-2,6,10-trienoate.

Similarly, in the above procedure, in place of using either the trans, trans or cis, trans isomer of 6,10-dimethyldodeca - 5,9 - dien - 2 - one as the starting material, there can be used as the starting material a mixture of isomers obtained in Part B and thereafter separating each individual isomer by preparative gas-liquid chromatography.

In the examples which follow, in some instances the isomeric forms are not specified; however, in each of the procedures set forth in the following examples, reference to the compound or compounds named is inclusive of each isomer thereof isomeric mixtures thereof. In other words, the following examples are illustrative of procedures which are applicable to starting materials embracing individual isomers or isomeric mixtures.

EXAMPLE 15

By repeating the process of Example 14, with the exceptions that in Part A thereof, methyl ethyl ketone is replaced with the ketones listed in Column V and the ketone thus-obtained is used in place of 6-methyl-5-octen-2-one in Part B, there is obtained the acid esters listed in Column VI.

| V | VI |
|---|---|
| Acetone | Methyl 3,7,11-trimethyldodeca-2,6,10-trienoate. |
| Methyl n-propyl ketone | Methyl 3,7,11-trimethyltetradeca-2,6,10-trienoate. |
| Diethyl ketone | Methyl 3,7-dimethyl-11-ethyl-trideca-2,6,10-trienoate. |
| Methyl i-propyl ketone | Methyl 3,7,11,12-tetramethyl-trideca-2,6,10-trienoate. |
| Methyl n-butyl ketone | Methyl 3,7,11-trimethylpentadeca-2,6,10-trienoate. |
| Ethyl n-propyl ketone | Methyl 3,7-dimethyl-11-ethyl-tetradeca-2,6,10-trienoate. |
| Methyl t-butyl ketone | Methyl 3,7,11,12,12-pentamethyl-trideca-2,6,10-trienoate. |
| Methyl i-butyl ketone | Methyl 3,7,11,13-tetramethyltetra-deca-2,6,10-trienoate. |
| Methyl s-butyl ketone | Methyl 3,1,11,12-tetramethyltetra-deca-2,6,10-trienoate. |
| Ethyl i-propyl ketone | Methyl 3,7,12-trimethyl-11-ethyl-trideca-2,6,10-trienoate. |
| Methyl n-amyl ketone | Methyl 3,7,11-trimethylhexadeca-2,6,10-trienoate. |
| Ethyl n-butyl ketone | Methyl 3,7-dimethyl-11-ethyl-pentadeca-2,6,10-trienoate. |

TABLE—Continued

| V | VI |
| --- | --- |
| 3-ethyl-2-pentanone | Methyl 3,7,11-trimethyl-12-ethyl-tetradeca-2,6,10-trienoate. |
| Diisopropyl ketone | Methyl 3,7,12-trimethyl-11-(i-propyl)-trideca-2,6,10-trienoate. |
| Methyl n-hexyl ketone | Methyl 3,7,11-trimethylheptadeca-2,6,10-trienoate. |
| 5-ethyl-3-heptanone | Methyl 3,7-dimethyl-11,12-diethyltetradeca-2,6,10-trienoate. |
| 4-decanone | Methyl 3,7-dimethyl-11-(n-propyl)-heptadeca-2,6,10-trienoate. |
| di-n-Amyl ketone | Methyl 3,7-dimethyl-11-(n-amyl)-hexadeca-2,6,10-trienoate. |
| di-n-Hexyl ketone | Methyl 3,7-dimethyl-11-(n-hexyl)-heptadeca-2,6,10-trienoate. |

EXAMPLE 16

The process of Example 14 is repeated with the exception that in Part A thereof, 1-bromo-4-pentanone is replaced with the 1-bromo-4-ketones listed in Column VII to furnish the acid esters listed in Column VIII.

| VII | VIII |
| --- | --- |
| 1-bromo-4-hexanone | Methyl 3,11-dimethyl-7-ethyltrideca-2,6,10-trienoate. |
| 1-bromo-4-heptanone | Methyl 3,11-dimethyl-7-(n-propyl)-trideca-2,6,10-trienoate. |
| 1-bromo-4-octanone | Methyl 3,11-dimethyl-7-(n-butyl)-trideca-2,6,10-trienoate. |
| 1-bromo-4-nonanone | Methyl 3,11-dimethyl-7-(n-amyl)-trideca-2,6,10-trienoate. |
| 1-bromo-5-methyl-4-hexanone | Methyl 3,11-dimethyl-7-(i-propyl)-trideca-2,6,10-trienoate. |
| 1-bromo-6-methyl-4-heptanone | Methyl 3,11-dimethyl-7-(i-butyl)-trideca-2,6,10-trienoate. |
| 1-bromo-5,5-dimethyl-4-hexanone | Methyl 3,11-dimethyl-7-(t-butyl)-trideca-2,6,10-trienoate. |

Similarly, by repeating the procedure of Example 15, using the 1-bromo-4-ketones listed in Column VII in place of 1-bromo-4-pentanone, there is obtained:

methyl 3,11-dimethyl-7-ethyldodeca-2,6,10-trienoate,
methyl 3,11-dimethyl-7-(n-propyl)-dodeca-2,6,10-trienoate,
methyl 3,11-dimethyl-7-(n-butyl)-dodeca-2,6,10-trienoate,
methyl 3,11-dimethyl-7-(n-butyl)-dodeca-2,6,10-trienoate,
methyl 3,11-dimethyl-7-(n-amyl)-dodeca-2,6,10-trienoate,
methyl 3,11-dimethyl-7-(i-propyl)-dodeca-2,6,10-trienoate,
methyl 3,11-dimethyl-7-(i-butyl)-dodeca-2,6,10-trienoate,
methyl 3,11-dimethyl-7-(t-butyl)-dodeca-2,6,10-trienoate,
methyl 3,11-dimethyl-7-ethyltetradeca-2,6,10-trienoate,
methyl 3,11-dimethyl-7-(n-propyl)-tetradeca-2,6,10-trienoate,
methyl 3,11-dimethyl-7-(n-butyl)-tetradeca-2,6,10-trienoate,
methyl 3,11-dimethyl-7-(n-amyl)-tetradeca-2,6,10-trienoate,
methyl 3,11-dimethyl-7-(i-propyl)-tetradeca-2,6,10-trienoate,
methyl 3,11-dimethyl-7-(i-butyl)-tetradeca-2,6,10-trienoate,
methyl 3,11-dimethyl-7-(t-butyl)-tetradeca-2,6,10-trienoate,
methyl 3-methyl-7,11-diethyltrideca-2,6,10-trienoate,
methyl 3-methyl-7-(n-propyl)-11-ethyltrideca-2,6,10-trienoate,
methyl 3-methyl-7-(n-butyl)-11-ethyltrideca-2,6,10-trienoate,
methyl 3-methyl-7-(n-amyl)-11-ethyltrideca-2,6,10-trienoate,
methyl 3-methyl-7-(i-propyl)-11-ethyltrideca-2,6,10-trienoate,
methyl 3-methyl-7-(i-butyl)-11-ethyltrideca-2,6,10-trienoate,
methyl 3-methyl-7-(t-butyl)-11-ethyltrideca-2,6,10-trienoate,
methyl 7-ethyl-3,11,12-trimethyltrideca-2,6,10-trienoate,
methyl 7-(n-propyl)-3,11,12-trimethyltrideca-2,6,10-trienoate,
methyl 7-(n-butyl)-3,11,12-trimethyltrideca-2,6,10-trienoate,
methyl 7-(n-amyl)-3,11,12-trimethyltrideca-2,6,10-trienoate,
methyl 7-(i-propyl)-3,11,12-trimethyltrideca-2,6,10-trienoate,
methyl 7-(i-butyl)-3,11,12-trimethyltrideca-2,6,10-trienoate,
methyl 7-(t-butyl)-3,11,12-trimethyltrideca-2,6,10-trienoate,
methyl 7-ethyl-3,11-dimethylpentadeca-2,6,10-trienoate,
methyl 7-(n-propyl)-3,11-dimethylpentadeca-2,6,10-trienoate,
methyl 7-(n-butyl)-3,11-dimethylpentadeca-2,6,10-trienoate,
methyl 7-(n-amyl)-3,11-dimethylpentadeca-2,6,10-trienoate,
methyl 7-(i-propyl)-3,11-dimethylpentadeca-2,6,10-trienoate,
methyl 7-(i-butyl)-3,11-dimethylpentadeca-2,6,10-trienoate,
methyl 7-(t-butyl)-3,11-dimethylpentadeca-2,6,10-trienoate,
methyl 3-methyl-7,11-diethyltetradeca-2,6,10-trienoate,
methyl 7-(n-propyl)-3-methyl-11-ethyltetradeca-2,6,10-trienoate,
methyl 7-(n-butyl)-3-methyl-11-ethyltetradeca-2,6,10-trienoate,
methyl 7-(n-amyl)-3-methyl-11-ethyltetradeca-2,6,10-trienoate,
methyl 7-(i-propyl)-3-methyl-11-ethyltetradeca-2,6,10-trienoate,
methyl 7-(i-butyl)-3-methyl-11-ethyltetradeca-2,6,10-trienoate,
methyl 7-(t-butyl)-3-methyl-11-ethyltetradeca-2,6,10-trienoate,
methyl 7-ethyl-3,11,12,12-tetramethyltrideca-2,6,10-trienoate,
methyl 7-(n-propyl)-3,11,12,12-tetramethyltrideca-2,6,10-trienoate,
methyl 7-(n-butyl)-3,11,12,12-tetramethyltrideca-2,6,10-trienoate,
methyl 7-(n-amyl)-3,11,12,12-tetramethyltrideca-2,6,10-trienoate,
methyl 7-(i-propyl)-3,11,12,12-tetramethyltrideca-2,6,10-trienoate,
methyl 7-(i-butyl)-3,11,12,12-tetramethyltrideca-2,6,10-trienoate, and
methyl 7-(t-butyl)-3,11,12,12-tetramethyltrideca-2,6,10-trienoate, respectively.

EXAMPLE 17

The process of Example 14 is repeated with the exception that in Part B, 1-bromo-4-pentanone is replaced with the 1-bromo-4-ketones listed in Column VII above furnishing the following acid esters:

methyl 7,11-dimethyl-3-ethyltrideca-2,6,10-trienoate,
methyl 7,11-dimethyl-3-(n-propyl)-trideca-2,6,10-trienoate,
methyl 7,11-dimethyl-3-(n-butyl)-trideca-2,6,10-trienoate,
methyl 7,11-dimethyl-3-(n-amyl)-trideca-2,6,10-trienoate,
methyl 7,11-dimethyl-3-(i-propyl)-trideca-2,6,10-trienoate,
methyl 7,11-dimethyl-3-(i-butyl)-trideca-2,6,10-trienoate,
methyl 7,11-dimethyl-3-(t-butyl)-trideca-2,6,10-trienoate.

Similarly, by repeating the procedure of Example 15 with the exception that the 1-bromo-4-ketones listed in Column VII are used in place of 1-bromo-4-pentanone in Part B of Example 14, there is obtained methyl 7,11-dimethyl-3-ethyldodeca-2,6,10-trienoate,
methyl 7,11-dimethyl-3-(n-propyl)-dodeca-2,6,10-trienoate,
methyl 7,11-dimethyl-3-(n-butyl)-dodeca-2,6,10-trienoate,
methyl 7,11-dimethyl-3-(n-amyl)-dodeca-2,6,10-trienoate,
methyl 7,11-dimethyl-3-(i-propyl)-dodeca-2,6,10-trienoate,
methyl 7,11-dimethyl-3-(i-butyl)-dodeca-2,6,10-trienoate,
methyl 7,11-dimethyl-3-(t-butyl)-dodeca-2,6,10-trienoate,
methyl 7,11-dimethyl-3-ethyltetradeca-2,6,10-trienate,
methyl 3-(n-propyl)-7,11-dimethyltetradeca-2,6,10-trienoate,
methyl 3-(n-butyl)-7,11-dimethyltetradeca-2,6,10-trienoate,
methyl 3-(n-amyl)-7,11-dimethyltetradeca-2,6,10-trienoate,
methyl 3-(i-propyl)-7,11-dimethyltetradeca-2,6,10-trienoate,
methyl 3-(i-butyl)-7,11-dimethyltetradeca-2,6,10-trienoate,
methyl 3-(t-butyl)-7,11-dimethyltetradeca-2,6,10-trienoate,
methyl 3,11-diethyl-7-methyltrideca-2,6,10-trienoate,
methyl 3-(n-propyl)-7-methyl-11-ethyltrideca-2,6,10-trienoate,
methyl 3-(n-butyl)-7-methyl-11-ethyltrideca-2,6,10-trienoate,
methyl 3-(n-amyl)-7-methyl-11-ethyltrideca-2,6,10-trienoate,
methyl 3-(i-propyl)-7-methyl-11-ethyltrideca-2,6,10-trienoate,
methyl 3-(i-butyl)-7-methyl-11-ethyltrideca-2,6,10-trienoate,
methyl 3-(t-butyl)-7-methyl-11-ethyltrideca-2,6,10-trienoate,
methyl 3-ethyl-7,11,12-trimethyltrideca-2,6,10-trienoate,
methyl 3-(n-propyl)-7,11,12-trimethyltrideca-2,6,10-trienoate,
methyl 3-(n-butyl)-7,11,12-trimethyltrideca-2,6,10-trienoate,
methyl 3-(n-amyl)-7,11,12-trimethyltrideca-2,6,10-trienoate,
methyl 3-(i-propyl)-7,11-,12-trimethyltrideca-2,6,10-trienoate,
methyl 3-(i-butyl)-7,11,12-trimethyltrideca-2,6,10-trienoate,
methyl 3-(t-butyl)-7,11,12-trimethyltrideca-2,6,10-trienoate,
methyl 7,11-dimethyl-3-ethylpentadeca-2,6,10-trienoate,
methyl 3-(n-propyl)-7,11-dimethylpentadeca-2,6,10-trienoate,
methyl 3-(n-butyl)-7,11-dimethylpentadeca-2,6,10-trienoate,
methyl 3-(n-amyl)-7,11-dimethylpentadeca-2,6,10-trienoate,
methyl 3-(i-propyl)-7,11-dimethylpentadeca-2,6,10-trienoate,
methyl 3-(i-butyl)-7,11-dimethylpentadeca-2,6,10-trienoate,
methyl 3-(t-butyl)-7,11-dimethylpentadeca-2,6,10-trienoate,
methyl 3,11-diethyl-7-methyltetradeca-2,6,10-trienoate,
methyl 3-(n-propyl)-7-methyl-11-ethyltetradeca-2,6,10-trienoate,
methyl 3-(n-butyl)-7-methyl-11-ethyltetradeca-2,6,10-trienoate,
methyl 3-(n-amyl)-7-methyl-11-ethyltetradeca-2,6,10-trienoate,
methyl 3-(i-propyl)-7-methyl-11-ethyltetradeca-2,6,10-trienoate,
methyl 3-(i-butyl)-7-methyl-11-ethyltetradeca-2,6,10-trienoate,
methyl 3-(t-butyl)-7-methyl-11-ethyltetradeca-2,6,10-trienoate,
methyl 3-ethyl-7,11,12,12-tetramethyltrideca-2,6,10-trienoate,
methyl 3-(n-propyl)-7,11,12,12-tetramethyltrideca-2,6,10-trienoate,
methyl 3-(n-butyl)-7,11,12,12-tetramethyltrideca-2,6,10-trienoate,
methyl 3-(n-amyl)-7,11,12,12-tetramethyltrideca-2,6,10-trienoate,
methyl 3-(i-propyl)-7,11,12,12-tetramethyltrideca-2,6,10-trienoate,
methyl 3-(i-butyl)-7,11,12,12-tetramethyltrideca-2,6,10-trienoate,
methyl 3-(t-butyl)-7,11,12,12-tetramethyltrideca-2,6,10-trienoate,
methyl 3-ethyl-7,11,13-trimethyltetradeca-2,6,10-trienoate,
methyl 3-(n-propyl)-7,11,13-trimethyltetradeca-2,6,10-trienoate,
methyl 3-(n-butyl)-7,11,13-trimethyltetradeca-2,6,10-trienoate,
methyl 3-(n-amyl)-7,11,13-trimethyltetradeca-2,6,10-trienoate,
methyl 3-(i-propyl)-7,11,13-trimethyltetradeca-2,6,10-trienoate,
methyl 3-(i-butyl)-7,11,13-trimethyltetradeca-2,6,10-trienoate,
methyl 3-(t-butyl)-7,11,13-trimethyltetradeca-2,6,10-trienoate,
methyl 3-ethyl-7,11,12-trimethyltetradeca-2,6,10-trienoate,
methyl 3-(n-propyl)-7,11,12-trimethyltetradeca-2,6,10-trienoate,
methyl 3-(n-butyl)-7,11,12-trimethyltetradeca-2,6,10-trienoate,
methyl 3-(n-amyl)-7,11,12-trimethyltetradeca-2,6,10-trienoate,
methyl 3-(i-propyl)-7,11,12-trimethyltetradeca-2,6,10-trienoate,
methyl 3-(i-butyl)-7,11,13-trimethyltetradeca-2,6,10-trienoate,
methyl 3-(t-butyl)-7,11,13-trimethyltetradeca-2,6,10-trienoate,
methyl 3,11-diethyl-7,12-dimethyltrideca-2,6,10-trienoate,
methyl 3-(n-propyl)-7,12-dimethyl-11-ethyltrideca-2,6,10-trienoate,
methyl 3-(n-butyl)-7,12-dimethyl-11-ethyltrideca-2,6,10-trienoate,
methyl 3-(n-amyl)-7,12-dimethyl-11-ethyltrideca-2,6,10-trienoate,
methyl 3-(i-propyl)-7,12-dimethyl-11-ethyltrideca-2,6,10-trienoate,
methyl 3-(i-butyl)-7,12-dimethyl-11-ethyltrideca-2,6,10-trienoate,
methyl 3-(t-butyl)-7,12-dimethyl-11-ethyltrideca-2,6,10-trienoate,
methyl 3-ethyl-7,11-dimethylhexadeca-2,6,10-trienoate,
methyl 3-(n-propyl)-7,11-dimethylhexadeca-2,6,10-trienoate,
methyl 3-(n-butyl)-7,11-dimethylhexadeca-2,6,10-trienoate,
methyl 3-(n-amyl)-7,11-dimethylhexadeca-2,6,10-trienoate,
methyl 3-(i-propyl)-7,11-dimethylhexadeca-2,6,10-trienoate, methyl 3-(i-butyl)-7,11-dimethylhexadeca-2,6,10-trienoate,
methyl 3-(t-butyl)-7,11-dimethylhexadeca-2,6,10-trienoate,
methyl 3,11-diethyl-7-methylpentadeca-2,6,10-trienoate,
methyl 3-(n-propyl)-7-methyl-11-ethylpentadeca-2,6,10-trienoate,
methyl 3-(n-butyl)-7-methyl-11-ethylpentadeca-2,6,10-trienoate,
methyl 3-(n-amyl)-7-methyl-11-ethylpentadeca-2,6,10-trienoate,
methyl 3-(i-propyl)-7-methyl-11-ethylpentadeca-2,6,10-trienoate,
methyl 3-(i-butyl)-7-methyl-11-ethylpentadeca-2,6,10-trienoate,
methyl 3-(t-butyl)-7-methyl-11-ethylpentadeca-2,6,10-trienoate,
methyl 3-(t-butyl)-7-methyl-11-ethylpentadeca-2,6,10-trienoate,
methyl 3,11,12-triethyl-7-methyltetradeca-2,6,10-trienoate,
methyl 3-(n-propyl)-7-methyl-11,12-diethyltetradeca-2,6,10-trienoate,
methyl 3-(n-butyl)-7-methyl-11,12-diethyltetradeca-2,6,10-trienoate,
methyl 3-(n-amyl)-7-methyl-11,12-diethyltetradeca-2,6,10-trienoate,
methyl 3-(i-propyl)-7-methyl-11,12-diethyltetradeca-2,6,10-trienoate,
methyl 3-(i-butyl)-7-methyl-11,12-diethyltetradeca-2,6,10-trienoate,
methyl 3-(t-butyl)-7-methyl-11,12-diethyltetradeca-2,6,10-trienoate,
methyl 3-ethyl-11-(i-propyl)-7,12-dimethyltrideca-2,6,10-trienoate,
methyl 3-(n-propyl)-11-(i-propyl)-7,12-dimethyltrideca-2,6,10-trienoate,
methyl 3-(n-butyl)-11-(i-propyl)-7,12-dimethyltrideca-2,6,10-trienoate,
methyl 3-(n-amyl)-11-(i-propyl)-7,12-dimethyltrideca-2,6,10-trienoate,
methyl 3,11-[di(i-propyl)]-7,12-dimethyltrideca-2,6,10-trienoate,
methyl 3-(i-butyl)-11-(i-propyl)-7,12-dimethyltrideca-2,6,10-trienoate,
methyl 3-(t-butyl)-11-(i-propyl)-7,12-dimethyltrideca-2,6,10-trienoate,
methyl 3-ethyl-7,11-dimethylheptadeca-2,6,10-trienoate,
methyl 3-(n-propyl)-7,11-dimethylheptadeca-2,6,10-trienoate,
methyl 3-(n-butyl)-7,11-dimethylheptadeca-2,6,10-trienoate,
methyl 3-(n-amyl)-7,11-dimethylheptadeca-2,6,10-trienoate,
methyl 3-(i-propyl)-7,11-dimethylheptadeca-2,6,10-trienoate,
methyl 3-(i-butyl)-7,11-dimethylheptadeca-2,6,10-trienoate,
methyl 3-(t-butyl)-7,11-dimethylheptadeca-2,6,10-trienoate,
methyl 7-methyl-3,11,13-triethyltetradeca-2,6,10-trienoate,
methyl 3-(n-propyl)-7-methyl-11,13-diethyltetradeca-2,6,10-trienoate,
methyl 3-(n-butyl)-7-methyl-11,13-diethyltetradeca-2,6,10-trienoate,
methyl 3-(n-amyl)-7-methyl-11,13-diethyltetradeca-2,6,10-trienoate,
methyl 3-(i-propyl)-7-methyl-11,13-diethyltetradeca-2,6,10-trienoate,
methyl 3-(i-butyl-7-methyl-11,13-diethyltetradeca-2,6,10-trienoate,
methyl 3-(t-butyl)-7-methyl-11,13-diethyltetradeca-2,6,10-trienoate,
methyl 3-ethyl-7-methyl-11-(n-propyl)-heptadeca-2,6,10-trienoate,
methyl 3,11-[di(n-propyl)]-7-methylheptadeca-2,6,10-trienoate,
methyl 3-(n-butyl)-11-(n-propyl)-7-methylheptadeca-2,6,10-trienoate,
methyl 3-(n-amyl)-11-(n-propyl)-7-methylheptadeca-2,6,10-trienoate,
methyl 3-(i-propyl)-11-(n-propyl)-7-methylheptadeca-2,6,10-trienoate,
methyl 3-(i-butyl)-11-(n-propyl)-7-methylheptadeca-2,6,10-trienoate,
methyl 3-(t-butyl)-11-(n-propyl)-7-methylheptadeca-2,6,10-trienoate,
methyl 3-ethyl-7-methyl-11-(n-amyl)-hexadeca-2,6,10-trienoate,
methyl 3-(n-propyl)-7-methyl-11-(n-amyl)-hexadeca-2,6,10-trienoate,
methyl 3-(n-butyl)-7-methyl-11-(n-amyl)-hexadeca-2,6,10-trienoate,
methyl 3,11-[di(n-amyl)]-7-methylhexadeca-2,6,10-trienoate,
methyl 3-(i-propyl)-7-methyl-11-(n-amyl)-hexadeca-2,6,10-trienoate,
methyl 3-(i-butyl)-7-methyl-11-(n-amyl)-hexadeca-2,6,10-trienoate,
methyl 3-(t-butyl)-7-methyl-11-(n-amyl)-hexadeca-2,6,10-trienoate,
methyl 3-ethyl-7-methyl-11-(n-hexyl)-heptadeca-2,6,10-trienoate,
methyl 3-(n-propyl)-7-methyl-11-(n-hexyl)-heptadeca-2,6,10-trienoate,
methyl 3-(n-butyl)-7-methyl-11-(n-hexyl)-heptadeca-2,6,10-trienoate,
methyl 3-(n-amyl)-7-methyl-11-(n-hexyl)-heptadeca-2,6,10-trienoate,
methyl 3-(n-butyl)-7-ethyl-11-methyltrideca-2,6,10-trienoate,
methyl 3-(i-butyl)-7-methyl-11-(n-hexyl)-heptadeca-2,6,10-trienoate, and
methyl 3-(t-butyl)-7-methyl-11-(n-hexyl)-heptadeca-2,6,10-trienoate, respectively.

Likewise, by repeating the procedure of Example 16 with the exception that the 1-bromo-4-ketones listed in Column VII are used in place of 1-bromo-4-pentanone in Part B of Example 14 there is obtained methyl 3,7-diethyl-11-methyltrideca-2,6,10-trienoate,
methyl 3-(n-propyl)-7-ethyl-11-methyltrideca-2,6,10-trienoate,
methyl 3-(n-butyl)-7-ethyl-11-methyltrideca-2,6,10-trienoate,
methyl 3-(n-amyl)-7-ethyl-11-methyltrideca-2,6,10-trienoate,
methyl 3-(i-propyl)-7-ethyl-11-methyltrideca-2,6,10-trienoate,
methyl 3-(i-butyl)-7-ethyl-11-methyltrideca-2,6,10-trienoate,
methyl 3-(t-butyl)-7-ethyl-11-methyltrideca-2,6,10-trienoate,
methyl 3-ethyl-7-(n-propyl)-11-methyltrideca-2,6,10-trienoate,
methyl 3-(i-propyl)-7-methyl-11-(n-hexyl)-heptadeca-2,6,10-trienoate,
methyl 3,7-[di(n-propyl)]-11-methyltrideca-2,6,10-trienoate,
methyl 3-(n-butyl)-7-(n-propyl)-11-methyltrideca-2,6,10-trienoate,
methyl 3-(n-amyl)-7-(n-propyl)-11-methyltrideca-2,6,10-trienoate,
methyl 3-(i-propyl)-7-(n-propyl)-11-methyltrideca-2,6,10-trienoate,
methyl 3-(i-butyl)-7-(n-propyl)-11-methyltrideca-2,6,10-trienoate, methyl 3-(t-butyl)-7-(n-propyl)-11-methyltrideca-2,6,10-trienoate,
methyl 3-ethyl-7-(n-propyl)-11-methyltrideca-2,6,10-trienoate,
methyl 3-(n-propyl)-7-(n-butyl)-11-methyltrideca-2,6,10-trienoate,
methyl 3,7-[di(n-butyl)]-11-methyltrideca-2,6,10-trienoate,
methyl 3-(n-amyl)-7-(n-butyl)-11-methyltrideca-2,6,10-trienoate,
methyl 3-(i-propyl)-7-(n-butyl)-11-methyltrideca-2,6,10-trienoate,
methyl 3-(i-butyl)-7-(n-butyl)-11-methyltrideca-2,6,10-trienoate,
methyl 3-(t-butyl)-7-(n-butyl)-11-methyltrideca-2,6,10-trienoate,
methyl 3-ethyl-7-(n-amyl)-11-methyltrideca-2,6,10-trienoate,
methyl 3-(n-propyl)-7-(n-amyl)-11-methyltrideca-2,6,10-trienoate,
methyl 3-(n-butyl)-7-(n-amyl)-11-methyltrideca-2,6,10-trienoate,
metyl 3,7-[di(n-amyl)]-11-methyltrideca-2,6,10-trienoate,
methyl 3-(i-propyl)-7-(n-amyl)-11-methyltrideca-2,6,10-trienoate,
methyl 3-(i-butyl)-7-(n-amyl)-11-methyltrideca-2,6,10-trienoate,
methyl 3-(t-butyl)-7-(n-amyl)-11-methyltrideca-2,6,10-trienoate,
methyl 3-ethyl-7-(i-propyl)-11-methyltrideca-2,6,10-trienoate,
methyl 3-(n-propyl)-7-(i-propyl)-11-methyltrideca-2,6,10-trienoate,
methyl 3-(n-butyl)-7-(i-propyl)-11-methyltrideca-2,6,10-trienoate,
methyl 3-(n-amyl)-7-(i-propyl)-11-methyltrideca-2,6,10-trienoate,
methyl 3,7-[di(i-propyl)]-11-methyltrideca-2,6,10-trienoate,
methyl 3-(i-butyl)-7-(i-propyl)-11-methyltrideca-2,6,10-trienoate,
methyl 3-(t-butyl)-7-(i-propyl)-11-methyltrideca-2,6,10-trienoate,
methyl 3-ethyl-7-(i-butyl)-11-methyltrideca-2,6,10-trienoate,
methyl 3-(n-propyl)-7-(i-butyl)-11-methyltrideca-2,6,10-trienoate,
methyl 3-(n-butyl)-7-(i-butyl)-11-methyltrideca-2,6,10-trienoate,
methyl 3-(n-amyl)-7-(i-butyl)-11-methyltrideca-2,6,10-trienoate,
methyl 3-(i-propyl)-7-(i-butyl)-11-methyltrideca-2,6,10-trienoate,
methyl 3,7-[di(i-butyl)]-11-methyltrideca-2,6,10-trienoate,
methyl 3-(t-butyl)-7-(i-butyl)-11-methyltrideca-2,6,10-trienoate,
methyl 3-ethyl-7-(t-butyl)-11-methyltrideca-2,6,10-trienoate,
methyl 3-(n-propyl)-7-(t-butyl)-11-methyltrideca-2,6,10-trienoate,
methyl 3-(n-butyl)-7-(t-butyl)-11-methyltrideca-2,6,10-trienoate,
methyl 3-(n-amyl)-7-(t-butyl)-11-methyltrideca-2,6,10-trienoate,
methyl 3-(i-propyl)-7-(t-butyl)-11-methyltrideca-2,6,10-trienoate,
methyl 3-(i-butyl)-7-(t-butyl)-11-methyltrideca-2,6,10-trienoate,
methyl 3,7-[di(t-butyl)]-11-methyltrideca-2,6,10-trienoate, respectively, and similarly,
methyl 3,7-diethyl-11-methyldodeca-2,6,10-trienoate,
methyl 7-(n-propyl)-3-ethyl-11-methyldodeca-2,6,10-trienoate,
methyl 7-(n-butyl)-3-ethyl-1-methyldodeca-2,6,10-trienoate,
methyl 7-(n-amyl)-3-ethyl-11-methyldodeca-2,6,10-trienoate,
methyl 7-(i-propyl)-3-ethyl-11-methyldodeca-2,6,10-trienoate,
methyl 7-(i-butyl)-3-ethyl-11-methyldodeca-2,6,10-trienoate,
methyl 7-(t-butyl)-3-ethyl-11-methyldodeca-2,6,10-trienoate,
methyl 3,7-diethyl-11-methyltetradeca-2,6,10-trienoate,
methyl 7-(n-propyl)-3-ethyl-11-methyltetradeca-2,6,10-trienoate,
methyl 7-(n-butyl)-3-ethyl-11-methyltetradeca-2,6,10-trienoate,
methyl 7-(n-amyl)-3-ethyl-11-methyltetradeca-2,6,10-trienoate,
methyl 7-(i-propyl)-3-ethyl-11-methyltetradeca-2,6,10-trienoate,
methyl 7-(i-butyl)-3-ethyl-11-methyltetradeca-2,6,10-trienoate,
methyl 7-(t-butyl)-3-ethyl-11-methyltetradeca-2,6,10-trienoate,
methyl 3,7,11-triethyltrideca-2,6,10-trienoate,
methyl 7-(n-propyl)-3,11-diethyltrideca-2,6,10-trienoate,
methyl 7-(n-butyl)-3,11-diethyltrideca-2,6,10-trienoate,
methyl 7-(n-amyl)-3,11-diethyltrideca-2,6,10-trienoate,
methyl 7-(i-propyl)-3,11-diethyltrideca-2,6,10-trienoate,
methyl 7-(i-butyl)-3,11-diethyltrideca-2,6,10-trienoate,
methyl 7-(t-butyl)-3,11-diethyltrideca-2,6,10-trienoate,
methyl 3,7-diethyl-11-methylpentadeca-2,6,10-trienoate,
methyl 7-(n-propyl)-3-ethyl-11-methylpentadeca-2,6,10,trienoate,
methyl 7-(n-butyl)-3-ethyl-11-methylpentadeca-2,6,10-trienoate,
methyl 7-(n-amyl)-3-ethyl-11-methylpentadeca-2,6,10-trienoate,
methyl 7-(i-propyl)-3-ethyl-1-methylpentadeca-2,6,10-trienoate,
methyl 7-(i-butyl)-3-ethyl-11-methylpentadeca-2,6,10-trienoate,
methyl 7-(t-butyl)-3-ethyl-11-methylpentadeca-2,6,10-trienoate,
methyl 3,7,11-triethyltetradeca-2,6,10-trienoate,
methyl 7-(n-propyl)-3,11-diethyltetradeca-2,6,10-trienoate,
methyl 7-(n-butyl)-3,11-diethyltetradeca-2,6,10-trienoate,
methyl 7-(n-amyl)-3,11-diethyltetradeca-2,6,10-trienoate,
methyl 7-(i-propyl)-3,11-diethyltetradeca-2,6,10-trienoate,
methyl 7-(i-butyl)-3,11-diethyltetradeca-2,6,10-trienoate,
methyl 7-(t-butyl)-3,11-diethyltetradeca-2,6,10-trienoate,
methyl 3,7-diethyl-11,12,12-trimethyltrideca-2,6,10-trienoate,
methyl 7-(n-propyl)-3-ethyl-11,12,12-trimethyltrideca-2,6,10-trienoate, and the like.

EXAMPLE 18

The procedure of Example 14 is repeated with the exception that in Part C, diethyl carbomethoxy methyl phosphonate is replaced with other dialkyl carboalkoxy methyl phosphonates, e.g. diethyl carbethoxy methyl phosphonate, diethyl n-propoxycarbonyl methyl phosphonate, dimethyl n-butoxycarbonyl methyl phosphonate, and the like, to furnish the corresponding alkyl 3,7,11-trimethyltrideca- 2,6,10-trienoate, e.g. ethyl 3,7,11-trimethyltrideca-2,6,10-trienoate, n-propyl 3,7,11-trimethyltrideca-2,6,10-trienoate, n-butyl 3,7,11-trimethyltrideca-2,6,10-trienoate, and the like.

Similarly, by repeating the procedure of Examples 15, 16 and 17 with the exception that diethyl carbomethoxy methyl phosphonate is replaced with diethyl carbethoxy methyl phosphonate, diethyl n-propoxycarbonyl methyl phosphonate and dimethyl n-butoxycarbonyl methyl phosphonate, the corresponding ethyl 2,6,10-trienoates, n-propyl 2,6,10-trienoates and n-butyl 2,6,10-trienoates are obtained. For example, ethyl 3,7,11-trimethyldodeca-2,6,10-trienoate,
n-propyl 3,7,11-trimethyldodeca-2,6,10-trienoate,
n-butyl 3,7,11-trimethyldodeca-2,6,10-trienoate,
ethyl 3,11-dimethyl-7-ethyltrideca-2,6,10-trienoate,
n-propyl 3,11-dimethyl-7-ethyltrideca-2,6,10-trienoate,
n-butyl 3,11-dimethyl-7-ethyltrideca-2,6,10-trienoate,
ethyl 3,11-dimethyl-7-ethyldodeca-2,6,10-trienoate,
n-propyl 3,11-dimethyl-7-ethyldodeca-2,6,10-trienoate,
n-butyl 3,11-dimethyl-7-ethyldodeca-2,6,10-trienoate,
ethyl 3-ethyl-7,11-dimethyltrideca-2,6,10-trienoate,
n-propyl 3-ethyl-7,11-dimethyltrideca-2,6,10-trienoate,
n-butyl 3-ethyl-7,11-dimethyltrideca-2,6,10-trienoate,
ethyl 3-ethyl-7,11-dimethyldodeca-2,6,10-trienoate,
n-propyl 3-ethyl-7,11-dimethyldodeca-2,6,10-trienoate,
n-butyl 3-ethyl-7,11-dimethyldodeca-2,6,10-trienoate,
ethyl 3,7-diethyl-11-methyltrideca-2,6,10-trienoate,
n-propyl 3,7-diethyl-11-methyltrideca-2,6,10-trienoate,
n-butyl 3,7-diethyl-11-methyltrideca-2,6,10-trienoate, and the like.

EXAMPLE 19

A mixture of 1 g. of methyl 3,7,11-trimethyltrideca-2,6,10-trienoate, 60 ml. of methanol, 0.1 g. of sodium carbonate, and 6 ml. of water is heated at reflux for two hours. The mixture is then cooled, diluted with water and extracted with ether. The ethereal extracts are washed with water, dried over sodium sulfate and evaporated to remove the solvent. The residue is subjected to fractional vacuum distillation to yield 3,7,11-trimethyltrideca-2,6,10-trienoic acid.

By repeating the procedure of this example with the exception of substituting the other acid esters, preferably the methyl esters or ethyl esters obtained by the above procedures (Examples 15, 16, 17 and 18) for methyl 3,7,11-trimethyltrideca-2,6,10-trienoate, there is obtained the corresponding free acids, e.g. 3,7,11-trimethyldodeca-2,6,10-trienoic acid, 3,11-dimethyl-7-ethyltrideca-2,6,10-trienoic acid, 3,7-diethyl-11-methyltrideca-2,6,10-trienoic acid, 3,11-dimethyl-7-ethyldodeca-2,6,10-trienoic acid, 7,11-dimethyl-3-ethyltrideca-2,6,10 - trienoic acid, 7,11-dimethyl-3-ethyldodeca-2,6,10-trienoic acid, and the like.

EXAMPLE 20

Part A

To a 15% solution of butyl lithium in hexane (420 ml.) is added at −10° C. with stirring, a solution of dry diethylamine (49 g.) in anhydrous ether (530 ml.). The mixture is then stirred for one hour at 20° C. to provide a 1 molar solution of diethylamino lithium.

Thereafter, an aliquot (50 ml.) of the thus-prepared solution is added to methyl 3,7,11-trimethyltrideca-2,6,10-trienoate (12.5 g.) in ether (50 ml.) and the mixture is stirred at room temperature for four hours. The mixture is washed with an aqueous 0.1 N hydrochloric acid solution and water to neutrality, dried over sodium sulfate and evaporated to dryness to yield N,N-diethyl-3,7,11-trimethyltrideca-2,6,10-trienamide.

Part B

By repeating the procedure outlined in Part A hereof with the exception of replacing diethylamine with the amines listed in Column IX, there is obtained the corresponding amides listed in Column X.

| IX | X |
|---|---|
| Ammonia | 3,7,11-trimethyltrideca-2,6,10-trienamide. |
| Methylamine | N-methyl-3,7-11-trimethyltrideca-2,6,10-trienamide. |
| Ethylamine | N-ethyl-3,7,11-trimethyltrideca-2,6,10-trienamide. |
| Dimethylamine | N,N-dimethyl-3,7,11-trimethyltrideca-2,6,10-trienamide. |
| n-Propylamine | N-n-propyl-3,7,11-trimethyltrideca-2,6,10-trienamide. |
| Isopropylamine | N-isopropyl-3,7,11-trimethyltrideca-2,6,10-trienamide. |
| n-Butylamine | N-n-butyl-3,7,11-trimethyltrideca-2,6,10-trienamide. |
| t-Butylamine | N-t-butyl-3,7,11-trimethyltrideca-2,6,10-trienamide. |
| n-Amylamine | N-n-amyl-3,7,11-trimethyltrideca-2,6,10-trienamide. |
| n-Hexylamine | N-n-hexyl-3,7,11-trimethyltrideca-2,6,10-trienamide. |
| Methylisopropylamine | N,N-methylisopropyl-3,7,11-trimethyltrideca-2,6,10-trienamide. |
| Ethylpropylamine | N,N-ethylpropyl-3,7,11-trimethyltrideca-2,6,10-trienamide. |
| Methylbutylamine | N,N-methylbutyl-3,7,11-trimethyltrideca-2,6,10-trienamide. |
| di-t-Butylamine | N,N-di-t-butyl-3,7,11-trimethyltrideca-2,6,10-trienamide. |
| Diisopropylamine | N,N-diisopropyl-3,7,11-trimethyltrideca-2,6,10-trienamide. |
| di-n-Butylamine | N,N-di-n-butyl-3,7,11-trimethyltrideca-2,6,10-trienamide. |
| Aniline | N-phenyl-3,7,11-trimethyltrideca-2,6,10-trienamide. |
| Diphenylamine | N,N-diphenyl-3,7,11-trimethyltrideca-2,6,10-trienamide. |
| 5-amino-1-pentanol | N-(5'-hydroxypentyl)-3,7,11-trimethyltrideca-2,6,10-trienamide. |
| 1-amino-2,3-propanediol | N-(2',3'-dihydroxypropyl)-3,7,11-trimethyltrideca-2,6,10-trienamide. |
| 2-(t-butylamino)-ethanol | N,N-(t-butyl),(2'-hydroxyethyl)-3,7,11-trimethyltrideca-2,6,10-trienamide. |
| 2-amino-1-methoxypropane | N-(1'-methoxyprop-2'-yl)-3,7,11-trimethyltrideca-2,6,10-trienamide. |
| 2,2-dimethoxyethylamine | N-(2',2'-dimethoxyethyl)-3,7,11-trimethyltrideca-2,6,10-trienamide. |
| di-(2-ethoxyethyl)-amine | N,N-diethyl-(2'-ethoxyethyl)-3,7-11-trimethyltrideca-2,6,10-trienamide. |
| 2-methoxy-3-aminohexane | N-(methoxyhexan-3'-yl)-3,7,11-trimethyltrideca-2,6,10-trienamide. |
| 2-methoxyethylamine | N-2'-methoxyethyl-3,7,11-trimethyltrideca-2,6,10-trienamide. |
| Pyrrolidine | N,N-pyrrolidino-3,7,11-trimethyltrideca-2,6,10-trienamide. |
| Piperidine | N,N-piperidino-3,7,11-trimethyltrideca-2,6,10-trienamide. |
| Morpholine | N,N-morpholino-3,7,11-trimethyltrideca-2,6,10-trienamide. |
| Piperazine | N,N-piperazino-3,7,11-trimethyltrideca-2,6,11-trienamide. |
| 4-methylpiperazine | N,N-4'-methylpiperazino-3,7,11-trimethyltrideca-2,6-10-trienamide. |
| 4-ethylpiperazine | N,N-4'-ethylpiperazino-3,7,11-trimethyltrideca-2,6,10-trienamide. |

In the instances a hydroxyamine is employed, the appropriate amount of butyl lithium reagent is required.

Part C

By repeating the procedure outlined in Part A hereof with the exception of replacing methyl-3,7,11-trimethyltrideca-2,6,10-trienoate with the other acid esters obtained by the procedures of Examples 14, 15, 16, 17, and 18, there are obtained the corresponding N,N-diethylamides thereof, for example, N,N-diethyl-3,7,11-trimethyldodeca-2,6,10-trienamide,
N,N-diethyl-3,11-dimethyl-7-ethyltrideca-2,6,10-trienamide,
N,N-diethyl-3,11-dimethyl-7-ethyldodeca-2,6,10-trienamide,
N,N-diethyl-7,11-dimethyl-3-ethyltrideca-2,6,10-trienamide,
N,N-diethyl-7,11-dimethyl-3-ethyldodeca-2,6,10-trienamide, N,N-diethyl-3,7-diethyl-11-methyltrideca-2,6,10-trienamide,
and so forth.

Part D

By repeating the procedure as outline in Part C hereof with the exception of replacing diethylamine with the amines listed in column IX of Part B hereof, the corresponding substituted amides thereof are prepared, for example, 3,7,11-trimethyltrideca-2,6,10-trienamide,
N-methyl-3,7,11-trimethyltrideca-2,6,10-trienamide,
N-methyl-3,11-dimethyl-7-ethyltrideca-2,6,10-trienamide, and the like, N-ethyl-3,7,11-trimethyltrideca-2,6-10-trienamide,
N-ethyl-3,11-dimethyl-7-ethyltrideca-2,6,10-trienamide, and the like, N,N-dimethyl-3,7,11-trimethyltrideca-2,6,10-trienamide,
N,N-dimethyl-3,11-dimethyl-7-ethyltrideca-2,6,10, trienamide, and so forth.

Part E

By repeating the procedures of Parts A, B, C, and D hereof with the exception of substituting for the procedure of Part A hereof the procedure set forth in Example 19 to convert the acid esters to the free acids followed by the procedures set forth in Examples 1, 2, and 3 hereof to prepare the acid amides, the corresponding acid amides of the esters prepared according to Examples 14, 15, 16, 17, and 18 hereof are prepared in an alternative manner.

It will be understood that the various geometric isomers of the above compounds, as set forth in Example 14 above for the starting compounds and as mentioned in the last paragraph of Example 14, Part C above, are analogously prepared.

EXAMPLE 21

Anhydrous hydrogen chloride is bubbled into 100 ml. of carbon tetrachloride at 0° C. until a saturated solution is obtained. One gram of N,N-diethyl-3,7,11-trimethyltrideca-2,6,10-trienamide is added and the resulting mixture is then allowed to stand at 0° C. for four days. The mixture is then evaporated under reduced pressure to yield an oil which is purified by silica chromatography to furnish N,N-diethyl-11-chloro-3,7,11-trimethyltrideca-2,6-dienamide.

In like manner, N,N-diethyl-11-chloro-3,7,11-trimethyldodeca-2,6-dienamide and N,N-diethyl-11-chloro-3,11-dimethyl-7-ethyltrideca-2,6-dienamide are prepared. Similarly, the corresponding 11-chlorodiene derivatives of the other hydrocarbon amides obtained as described in Example 20 are prepared.

What is claimed is:
1. A compound selected from those of the following formula:

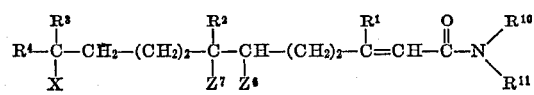

wherein, each of $R^1$, $R^2$, $R^3$ and $R^4$ is lower alkyl;
each of $R^{10}$ and $R^{11}$ is hydrogen or lower alkyl;
$Z^6$, when taken separately, is hydrogen;
$Z^7$, when taken separately, is hydrogen;
$Z^6$ and $Z^7$, when taken together, form a carbon-carbon bond; and
X is bromo, chloro or fluoro.

2. A compound according to claim 1 wherein each of $R^1$, $R^2$, $R^3$ and $R^4$ is methyl or ethyl.
3. A compound according to claim 2 wherein X is chloro.
4. A compound according to claim 3 wherein each of $Z^6$ and $Z^7$ is hydrogen.
5. A compound according to claim 4 wherein each of $R^1$, $R^2$, $R^3$ and $R^4$ is methyl.
6. The compound, trans N,N-diethyl 11-chloro-3,7,11-trimethyldodec-2-enamide, according to claim 5.
7. The compound, trans N,N-diethyl 11-fluoro-3,7,11-trimethyldodec-2-enamide, according to claim 2.
8. The compound, trans,trans N,N-diethyl 11-chloro-3,7,11 - trimethyldodeca - 2,6 - dienamide, according to claim 3.
9. The compound, trans,trans N,N-diethyl 11-bromo-3,7,11 - trimethyldodeca - 2,6 - dienamide, according to claim 2.
10. The compound, trans,trans N,N-diethyl 11-fluoro-3,7,11 - trimethyldodeca - 2,6 - dienamide, according to claim 2.

References Cited
FOREIGN PATENTS
1,316,043   12/1962   France.

LEWIS GOTTS, Primary Examiner

D. G. RIVERS, Assistant Examiner

U.S. Cl. X.R.

260—247.7 H, 268 C, 293.86, 326.5 E, 340.9, 345.7, 347.3, 348 A 408, 410.9 R, 488 H, 557 R, 593 R; 424—320, DIG 12